(12) United States Patent  
Causey et al.

(10) Patent No.: US 8,126,512 B2
(45) Date of Patent: Feb. 28, 2012

(54) BLIND DIALING

(75) Inventors: Mark Edward Causey, Tucker, GA (US); Adrianne Binh Luu, Roswell, GA (US); Scott Andrus, Prior Lake, MN (US); Kevin Wray Jones, St. Louis Park, MN (US)

(73) Assignee: AT&T Mobility II LLC, Atlanta, GA (US)

( * ) Notice: Subject to any disclaimer, the term of this patent is extended or adjusted under 35 U.S.C. 154(b) by 1035 days.

(21) Appl. No.: 12/038,647

(22) Filed: Feb. 27, 2008

(65) Prior Publication Data

US 2009/0215494 A1 Aug. 27, 2009

(51) Int. Cl.
*H04M 11/00* (2006.01)

(52) U.S. Cl. ......... 455/563; 455/564; 340/4.1; 367/198; 379/52

(58) Field of Classification Search .................. 455/564, 455/569.1, 563; 340/4.1; 367/198; 379/52
See application file for complete search history.

(56) References Cited

U.S. PATENT DOCUMENTS

| | | | | |
|---|---|---|---|---|
| 4,706,067 A * | 11/1987 | Hauck | | 341/27 |
| 6,813,342 B1 * | 11/2004 | Chu et al. | | 379/88.01 |
| 6,850,782 B2 * | 2/2005 | Bright et al. | | 455/567 |
| 7,446,669 B2 * | 11/2008 | Liebermann | | 340/4.1 |
| 7,965,196 B2 * | 6/2011 | Liebermann | | 340/4.11 |
| 2005/0059432 A1 * | 3/2005 | Choi | | 455/563 |
| 2005/0175169 A1 * | 8/2005 | Boda | | 379/355.01 |
| 2006/0199601 A1 * | 9/2006 | Cho | | 455/466 |
| 2009/0042534 A1 * | 2/2009 | Levanen | | 455/404.2 |

* cited by examiner

*Primary Examiner* — Lester Kincaid
*Assistant Examiner* — Steven Kelley
(74) *Attorney, Agent, or Firm* — Moazzam & Associates, LLC (57) ABSTRACT

Devices and methods are presented to remotely dial wireless communications devices. A device is equipped with a microphone and a plurality of logic units to analyze incoming acoustic signals in the form of Morse code. Acoustic signals may comprise tapping sounds, or voice patterns to create the "dits" and "dahs" associated with Morse code. Background noise can be eliminated using digital signal processing (DSP). The device can be used in a variety of environments where phone numbers and addresses need to be dialed from a distance or in emergency situations.

14 Claims, 5 Drawing Sheets

BLIND DIALING

BACKGROUND OF THE INVENTION

1. Field of the Invention

The present invention relates to wireless communications devices. In particular, the present invention relates to remote use of wireless communication devices, including remote dialing and other alternative methods of dialing phones.

2. Background of the Invention

Some types of remote operation of wireless communications devices are known in the art. In particular, "voice dialing" features allow a users of a device to dial a phone number by simply speaking a phone number or an otherwise identifying word associated with the number. A user could say the word "home" to dial his home phone number. Another method of remote dialing involves using a BLUETOOTH™ headset or external keypad.

Though these remote dialing features can be quite convenient, they often require extensive individualized training of the software on the device. For instance, the user must repeat specific phrases or numbers multiple times so that the voice recognition features of the device can be properly calibrated. Through the use of more sophisticated voice recognition software, it may be possible for the user to forgo having to train their device in this manner. Nonetheless, often such devices still require an extensive set-up, for example, by requiring the user to speak an identifying word ("home") for each phone number to be stored for voice dialing. Although such procedures might not be prohibitive for individual users, a large company wishing to equip 500 workers with such devices might find these procedures too tedious and expensive, especially considering that one particular phone might have multiple users, not all of whom may have the same accents or language capabilities.

As well, either method for implementing voice dialing tends to be unreliable even under ideal conditions. Ideal conditions for voice dialing provide limited or no background noise and a device microphone having close proximity to the speaker's mouth for clear voice recognition. Despite these, repeat attempt are normal in today's voice recognition software, and some types of sounds are harder to detect than others. Furthermore, conditions are not always ideal for voice dialing. For example, a worker trapped in a collapsed mine might be physically separated from the phone in a noisy environment with many obstacles between the user and the phone. If the worker is injured, it is possible the worker may not be able to speak clearly or at all. These and other similar emergency conditions can limit the use of current remote dialing methods.

Clearly, there is a need for a wireless communications device that can be remotely operated without requiring extensive set-up, would be less dependent on an ideal operating environment, and would still be useful in non-ideal situations, such as emergency situations.

SUMMARY OF THE INVENTION

The present invention is a wireless communications device adapted to receive Morse code, both acoustically (e.g., remotely) and via the keypad. Morse code is a much simpler method of conveying information than spoken language. Thus, recognition of the "dits" and "dahs" which form the basic elements of Morse code would be much simpler for the signal processor than would, for example, recognition of a voice sample. This is a crucial factor in emergency situations that often present difficult circumstances, such as noisy operating environments. Operation of the device in this mode requires no training or complicated programming to accommodate remote dialing, making it ideal for situations where it might be handled by multiple users. Furthermore, there is flexibility in how the "dit" and "dah" sounds can be produced, either by varying the duration of each sound to produce dit and dah ("voice mode") or by varying the amplitude of each sound to produce dit and dah ("tapping mode").

The wireless communications device is also adapted to receive Morse code through the keypad ("keypad mode"). In this mode, the "dits" and "dahs" of Morse code are produced by pressing any key on the device's keypad, varying the duration of the pressure to produce the "dit" versus the "dah". This "keypad mode" would be useful for, for example, people with vision problems or other disabilities.

DETAILED DESCRIPTION OF THE INVENTION

Figure 1A:
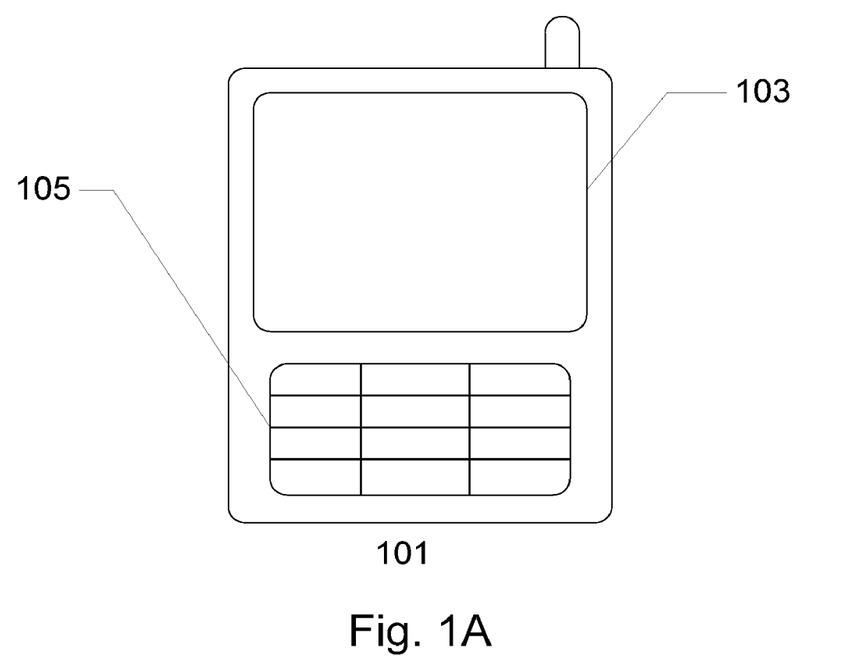
FIG. 1 shows two views of a device equipped to receive Morse code, according to an exemplary embodiment of the present invention.
Figure 1B:
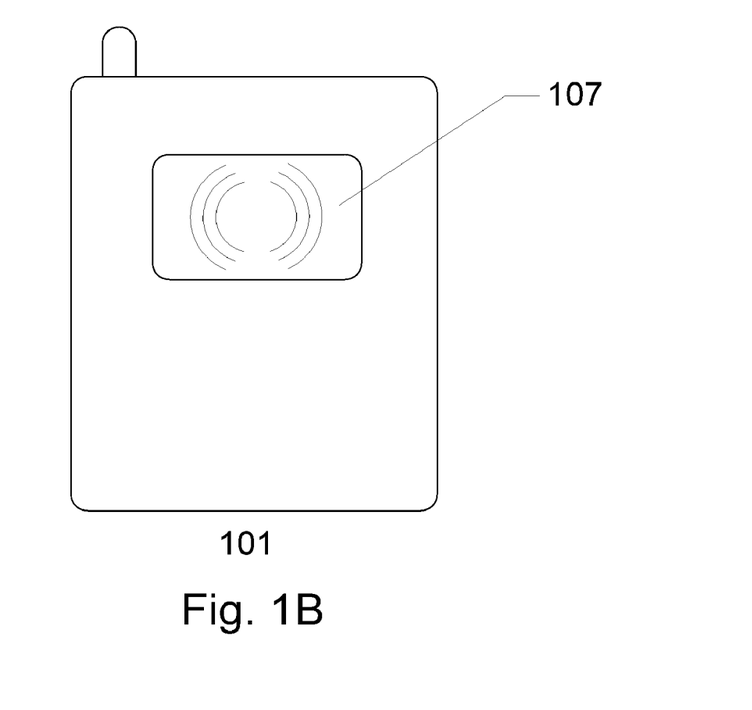

Representing an exemplary embodiment, FIG. 1 shows a wireless communications device 101 incorporating the teachings of the present invention. Wireless communications device 101 receives any possible acoustic Morse signals via a microphone 107. In one embodiment, microphone 107 is separate from the microphone the user speaks into during normal conversation. In an alternative embodiment, whenever a call is not in progress, device 101 always checks whether it is being sent any transmissions in Morse code, either via its keypad 105 or acoustically via separate microphone 107. When wireless communications device 101 recognizes a valid phone number it has received in Morse code, device 101 will indicate to the user that it has recognized a valid phone number. This indication could be in the form of an audio "beep" or a visual indicator, or any equivalent mechanism. Device 101 will then automatically dial the number, display the dialed number on a screen 103, and activate the device's speaker-phone capability (thereby enabling remote use). If the phone number recognized is a not a valid number, for instance if device 101 receives only 7 of 10 digits), device 101 could 'beep' back any received digits in Morse code so the user could see how to fix their transmission. In another exemplary embodiment, device 101 has GPS ability and automatically sends its GPS coordinates as a text message to the same phone number it has automatically dialed.

Standard Morse code provides representations of all numbers and letters. The small dot will henceforth be referred to as "dit" and the long bar will be referred to as "dah". In an exemplary embodiment, the wireless communications device is set up to receive only numbers in Morse and not letters or any punctuation. In conventional Morse code transmissions, the spaces between the dits and dahs carries information about how to interpret the dits and the dahs and the letters they represent (e.g., as pieces of separate words or letters). Note that since the digits 0-9 all are composed of 5 dits or dahs and they are being used to form phone numbers only, the spaces between them do not need to carry any information. Therefore, the spaces can be ignored in embodiments of the present invention where the wireless communications device can only receive phone numbers to be dialed in acoustic Morse. In another embodiment of the present invention, the wireless communications device could accommodate sending letters or punctuation in addition to digits. This would be useful for sending text to the device such as a text message or any other address using alphanumeric characters and/or symbols.

In one embodiment of the present invention, there are two modes for transmitting Morse code to the device acoustically, a "tapping mode" and a "voice mode". In tapping mode, the dits and dahs of Morse code would be achieved by producing "soft" (for dit) and "loud" (for dah) sounds of very short duration. In voice mode, the dits and dahs would be produced by producing a constant amplitude sound of short duration (for dit) and longer duration (for dah). In keeping with Morse code convention, the duration of the dah should be three times longer than the dit in voice mode. This is only a guideline however, not a strict necessity; variations can be made depending on the algorithms used to process incoming signals. In tapping mode, the dah's amplitude would be 3 times as high as the dit's. Again, this is purely a guideline and not a necessity. Tapping mode is so named because communicating in Morse by tapping on an object would produce the kind of dits and dahs previously mentioned in connection with this mode. Voice mode is so named because communicating by audibly speaking "dit" or "dah" could achieve the kind of dits and dahs previously mentioned in connection with this mode.

Figure 2:
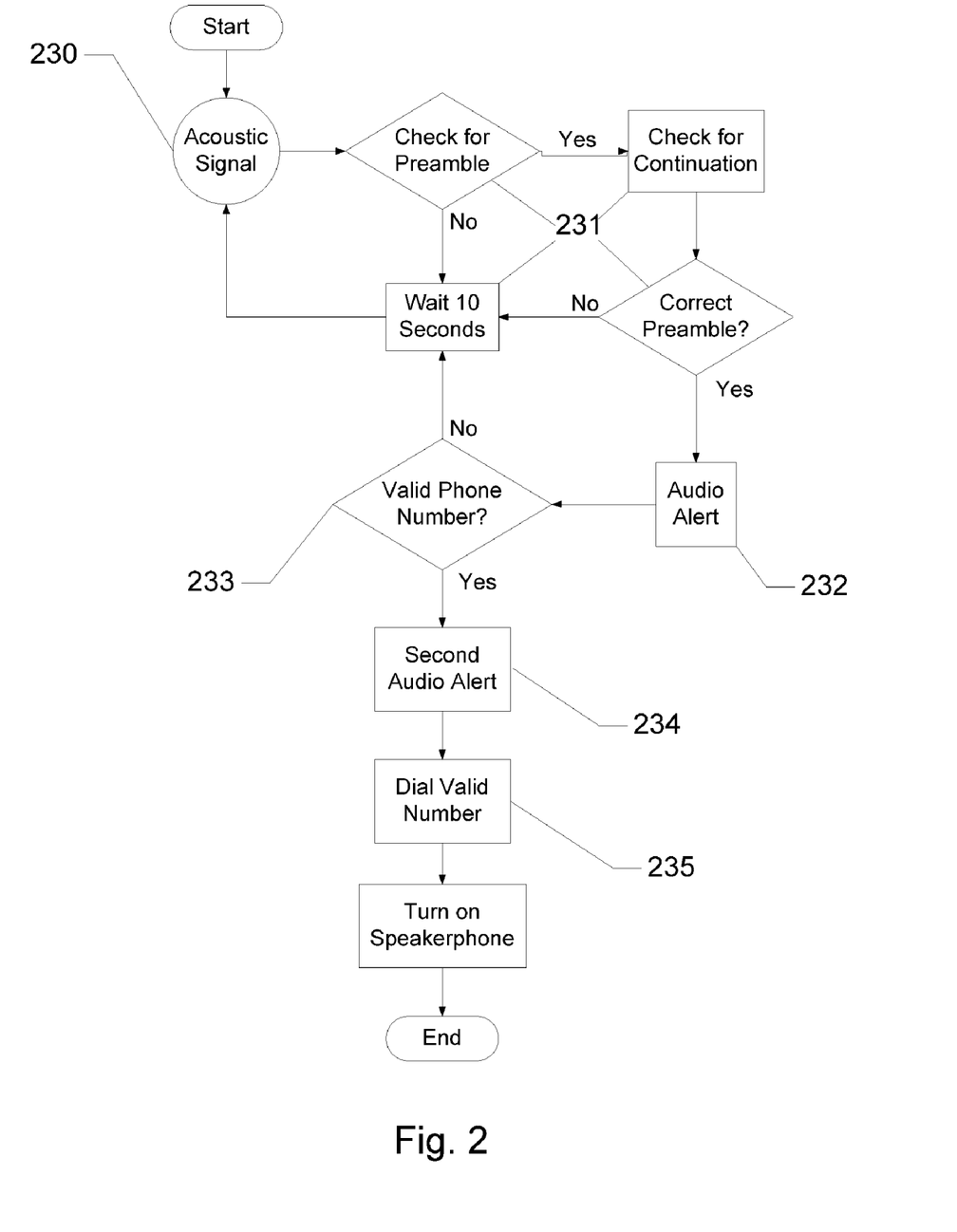
FIG. 2 is a flow chart illustrating how a device could make phone calls using acoustic Morse code, according to an exemplary embodiment of the present invention.

FIG. 2 is flow chart illustrating more specifically how a device could make phone calls using acoustic Morse code, according to an exemplary embodiment of the present invention. Acoustic signal 230 could be any acoustic signal received by the microphone, whether an actual Morse code transmission or simply background noises or sounds. In one embodiment, the user communicates to the device that he wishes to send a Morse code transmission to the device by sending the repeated message "dit-dah-dit-dah . . . " (the preamble) to the device until the device indicates that it has recognized the preamble to the message and is ready to process the forthcoming telephone number or instruction in Morse code. This is exemplified in the loop 231 in FIG. 2. Every 10 seconds, the device analyzes the 10 seconds of acoustic signal 230 it has just received, attempting to see if the "dit-dah-dit-dah . . . " preamble has been sent. Note that it makes no difference if the user starts to send the preamble in the middle of some given 10 second sequence, since the message simply gets repeated over and over. When the device has recognized the preamble, an alert is transmitted (232) via audio, or visually, to the user. The device then receives and processes the forthcoming acoustic signal 230 until it recognizes a valid phone number has been sent to it (233). At this point, the user can be notified (234) via an audio or visual alert that a number is being dialed (235) from the device.

In an exemplary embodiment, the method for recognizing the preamble is to send the 10 seconds of a digitized version of acoustic signal 230 to a digital signal processor to identify "peaks" or "blocks" in the data. Peaks and blocks are described herein in reference to FIG. 3, where a simple dit-dah pattern is displayed. Peaks 311 in the signal 310 correspond to either dits or dahs in tapping mode 310 and blocks 321 in signal 320 correspond to either dits or dahs in voice mode 320. These peaks and blocks are rather distinctive so should not be too difficult for the processor to recognize. For instance, in looking for peaks 311, the processor could try and find points in the signal where the signal amplitude rises to at least double the background noise level 313 and then falls back to the background noise level 313.

Figure 3:
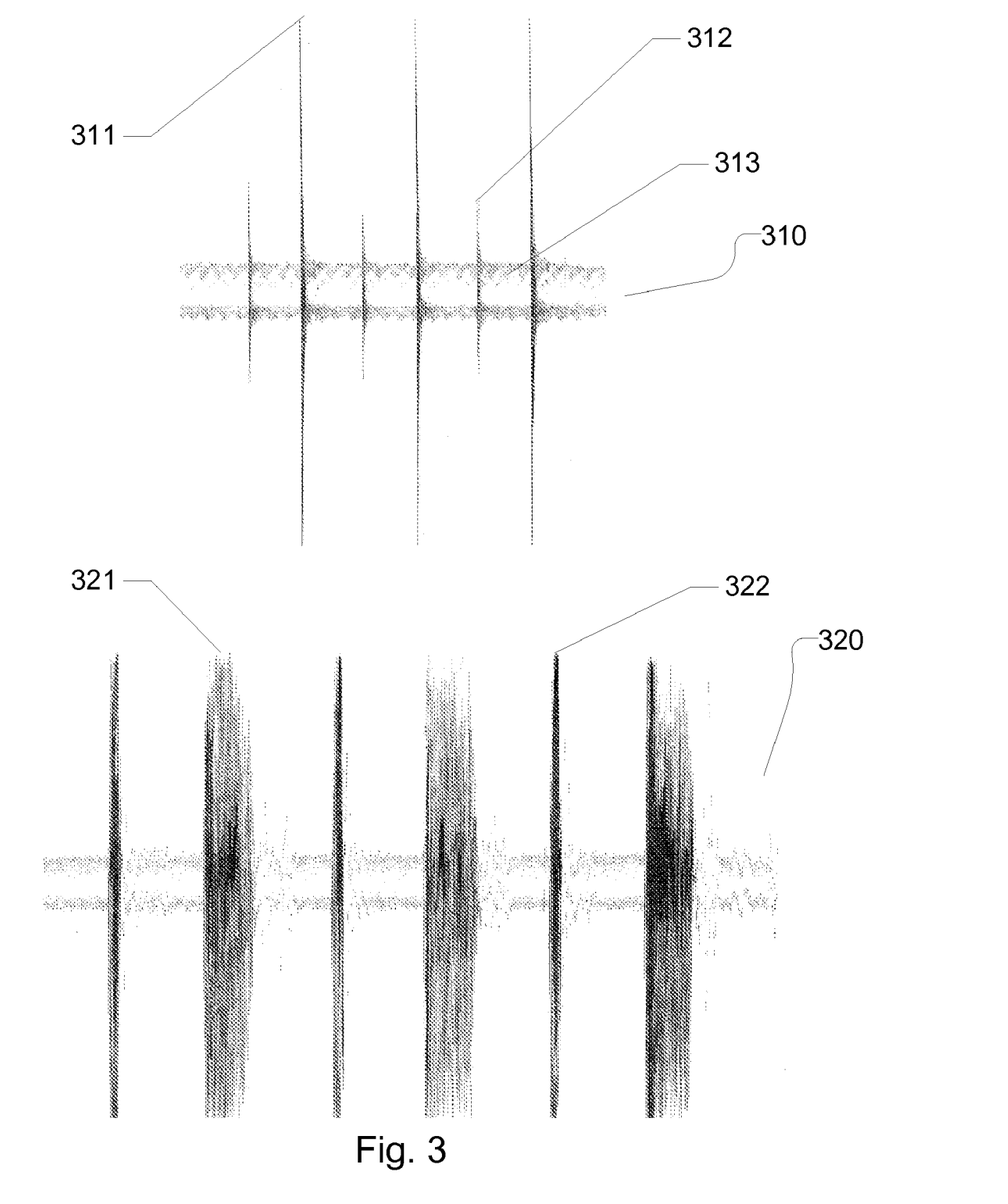
FIG. 3 shows sample waveforms representing transmission of Morse code "dits" and "dahs" in two exemplary modes of operation of the present invention.

Once several such points are identified, by comparing them, the processor can decide if they truly form part of a pattern or are simply random sounds. For example, peaks 311 should be of approximately the same duration and the dits should be approximately of the same amplitude (as with the dahs as well). If they do not form part of a pattern, the 10-second signal 310 could be discarded and the next 10 second signal could be analyzed. If there are similarities in peaks 311 or blocks 321 which occur, the processor can detect if they alternate in the prescribed dit-dah pattern, thus being able to decide if the preamble to an acoustic Morse code signal has really been sent. The tolerance of the processor can be set to accommodate, for example, sounds outside of the dit-dah pattern since the present invention is expected to be operable in non-ideal environments. If the pattern is correct, a Morse code microprocessor or logic unit sets the mode of transmission (tapping mode or voice mode) and instructs the digital signal processor to receive the transmission of the acoustic Morse code.

Figure 4:
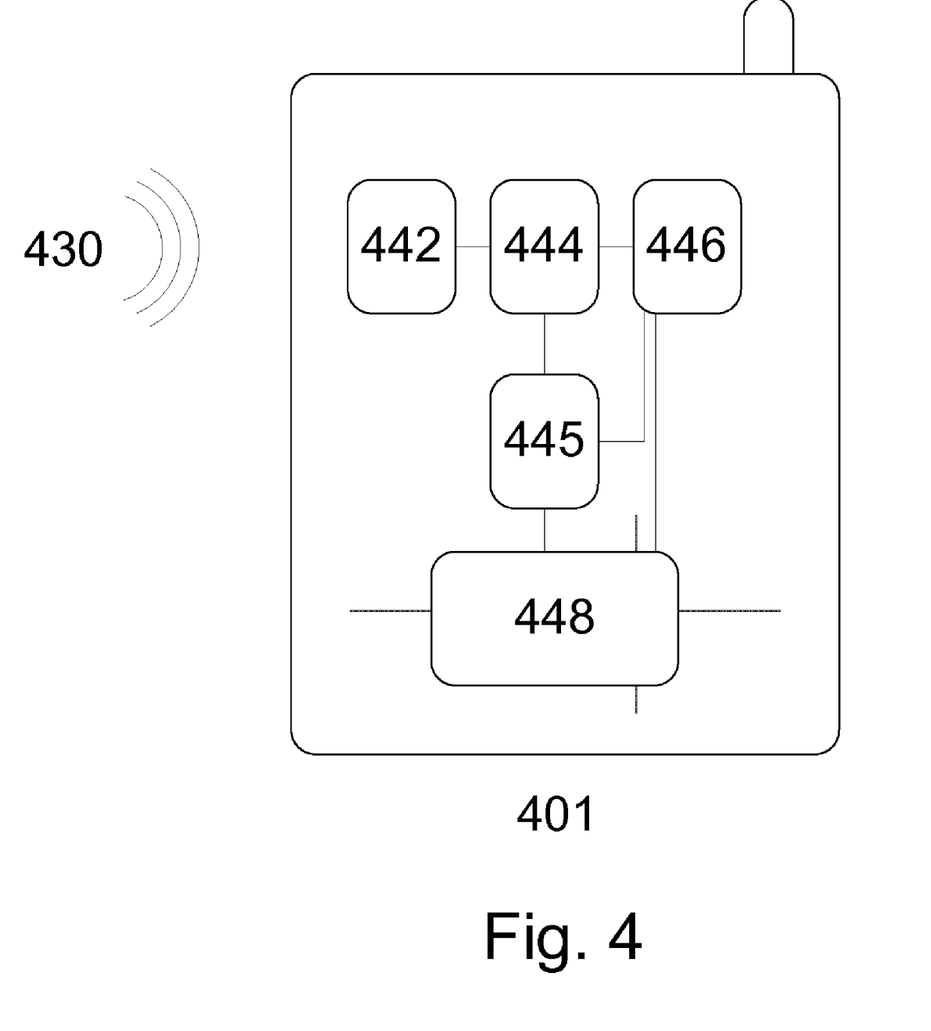
FIG. 4 shows the inner components of a mobile communications device equipped to receive Morse code, according to an exemplary embodiment of the present invention.

In one embodiment, once the wireless communications device of the present invention has decided that it has received the correct preamble to an acoustic Morse code message, it would 'beep' once, letting the user know that it has received the preamble and is ready to receive the actual Morse code transmission. Referring to FIG. 4, any acoustic signal 430 received at this point would be digitized by an analog to digital converter 442 and stored in memory 445 as directed by a Morse code microprocessor 444. Morse code microprocessor 444 would then pass along the digital signal from memory and the information about the mode of transmission of the acoustic Morse signal 430 (e.g., voice mode or tapping mode) to digital signal processor 446 for analysis of this piece of the signal. In one embodiment, 30 seconds of digitized acoustic data at a time could be passed to digital signal processor 446 coded with an appropriate algorithm for translating the Morse code transmitted. An example of such an algorithm is discussed below with reference to FIG. 5. In a preferred embodiment, digital signal processor 446 outputs any numbers identified to memory 445. When memory 445 contains a valid phone number (10 digits, for example, in the United States), Morse code microprocessor 444 sends this phone number to the wireless communications device's controlling processor 447 so it can be dialed. In one embodiment, the microprocessor is set up to recognize "911" as a valid phone number instead of waiting to receive 10 digits before sending this information to controlling processor 447.

Figure 5:
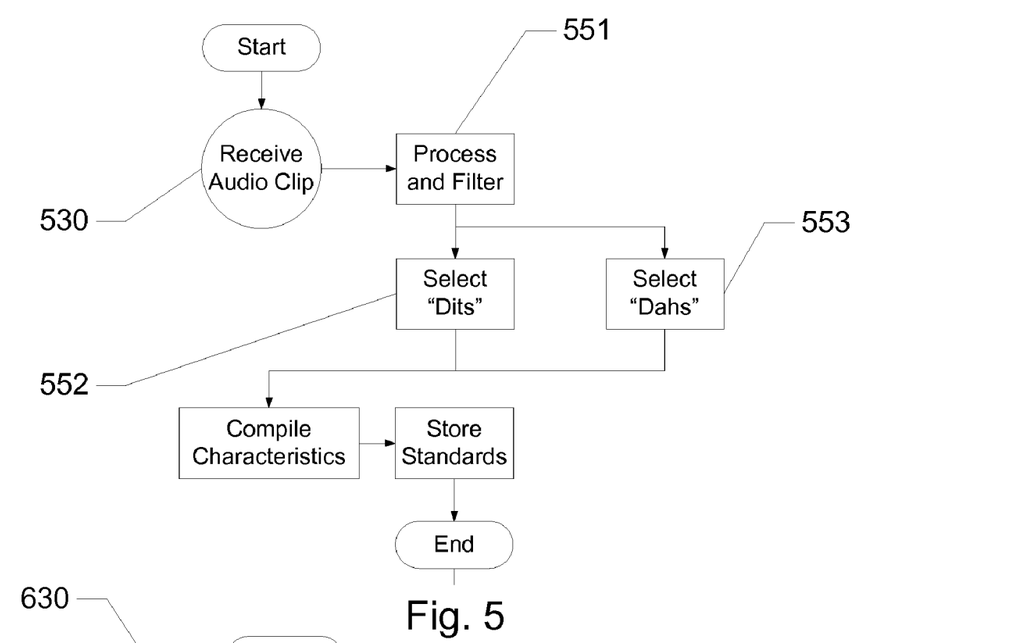
FIG. 5 shows a flow chart illustrating an algorithm for processing and filtering an incoming acoustic signal, according to an exemplary embodiment of the present invention.
Figure 6:
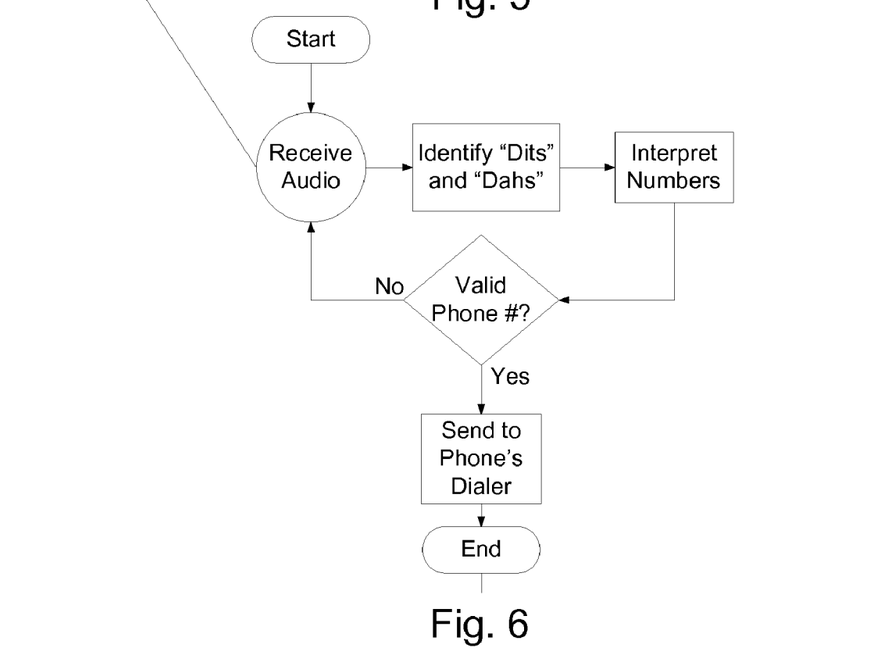
FIG. 6 shows a flow chart illustrating an algorithm for converting a received signal into a dialed number, according to an exemplary embodiment of the present invention.

FIG. 5 illustrates an algorithm that could be coded into the digital signal processor for analysis of the Morse code signal, according to an exemplary embodiment of the present invention. In FIG. 5, a digital signal 530 is received from an analog to digital converter before it is analyzed for the phone number. Signal 530 is then sent to a digital signal processor. The digital signal processor first filters (551) signal 530 to remove random noise and smooth the acoustic data. This aids in recognition of the dits 552 and dahs 553 present in signal 530.

Digital signal processor then analyzes the 30 seconds of acoustic data that has been sent for a calibration. This analysis is used to discriminate a dit from a dah in the signal. In an exemplary embodiment, this method would comprise identifying the most "likely" dits and the most "likely" dahs in signal 530, and using these to compute expected characteristics of dits and dahs present in signal 530. For instance, in tapping mode, easily measurable characteristics of these "dits" and "dahs" could be:

1. that the candidate portion of signal 530 rises from and falls to several times the overall noise level in the signal over a first measurable duration of time.
2. that there is only background noise present in the signal for a longer duration comprising many first durations of time both before and after the candidate dit or dah occurs.
3. that the characteristics of the candidate dit or dah occur are approximately repeated many times throughout signal 530.

In one exemplary embodiment, the area underneath the candidate dit or dah within the signal waveform could be computed and compared to the area underneath all other candidate dits and dahs present in signal 530. Similarly, the duration of the candidate dit or dah could be compared to that of all other candidate dits or dahs present in signal 530. All dits or dahs within some certain tolerance factor (for example, one standard deviation) from the mean of the durations could be analyzed to identify the two areas that would define the standard for dit and dah. By identifying clusters in such candidate dits or dah's areas, the digital signal processor could select a first standard expected area for a candidate dit and a second expected area for a candidate dah. Any portion of the signal of a duration whose area is within a certain tolerance factor of the first area would henceforth be identified as a dit and any portion of the signal within a certain tolerance factor of the second area would henceforth be identified as a dah.

Not all dits or dahs may meet these standards. Noise or other sounds present in the signal may partially obscure particular dits or dahs. This calibration relies only on identifying the most probable dits and dahs from which to calculate standards. These standards then can be applied to any data present in the signal to see if they correspond to dits, dahs, or neither a dit nor a dah. Portions of the signal not meeting the standards for either dit or dah would be presumed to be noises that are not part of the Morse code transmission and would simply be ignored.

Additionally, it may be necessary to truncate the end portion of signal 530 in the case that a non-trivial (e.g., non-noise) portion of the received 30 seconds overlaps into the next 30 second digitized signal. In this case, the digital signal processor would alert the Morse code microprocessor to append the full measure of the truncated portion into the next 30 second digitized signal as stored in the memory. For example, suppose the digital signal processor notes that there is a non-trivial portion of the signal occurring at t=29.2 seconds and not concluding before t=30 seconds. It could omit the last 0.8 seconds of the signal from analysis and send a message to the Morse code microprocessor asking it to set its memory address tracker so that the last 0.8 seconds of the present transmission are sent in the next transmission. In this instance, the next transmission directed by the Morse code processor would be data from t=29.2 seconds to t=59.2 seconds of the acoustic signal. In an embodiment, this procedure for calibrating the standards could be dynamic in the sense that any characteristic factors (for example, first and second areas) could be updated as more data is received by the Morse code microprocessor.

To apply these standards to the signal, the digital signal processor identifies any candidate dits or dahs present in the signal. Candidate dits or dahs are simply portions of the signal which rise from the background noise level for any period of time. Using the calibration standards, all such candidates are analyzed and assigned to be a dit, a dah, or neither dit nor dah. In an exemplary embodiment, identified dits or dahs are stored sequentially in a cache and the data stored in this cache could be compared to a standard Morse code table to identify any numbers present in the signal. Thus identified numbers are written to the memory and the dit/dah cache is cleared in preparation for reception of the next 30 seconds of data. In a preferred embodiment, this process repeats until the memory has received 10 digits or the digits 911, at which point, the Morse code microprocessor sends this phone number to the device's controlling processor so it can be dialed.

In addition to voice mode and tapping mode, the present invention teaches another mode for dialing a phone number using Morse code: "keypad mode". In keypad mode, the dits and dahs of Morse code are communicated to the device by pressing any particular key on the wireless communication device's keypad (for example, the "1" key), varying the duration of these touches to produce a dit versus a dah. In other words, this mode of operation is similar to voice mode, with pressing a key on the keypad taking the place of saying dit and dah. Such a mode of operation could be useful for someone with vision problems or another disability which would prevent them from using the full keypad for dialing.

In one embodiment, information about the duration of any keypad touch is stored and the Morse code microprocessor sends the digital signal processor data about the durations of keypad touches 30 seconds at a time exactly as if the information came from the Morse code microprocessor operating in voice mode. This process would continue until either a full phone number has been sent to memory or until a key other than the repeated key is pressed, interrupting the stream of repeated digits (for example, pressing "2" after "1" has been pressed repeatedly). This mode of operation is different from voice mode in that it doesn't require the user to send the preamble before the phone number encoded in Morse. Moreover, Morse code microprocessor can be bypassed in certain cases when a user pressing one key on the keypad dozens of times in a row without interruption, as this may signal intent to dial a phone number directly.

Other additional features may increase the functionality of this invention, especially in emergency situations. In an embodiment, the wireless communications device could be equipped with a GPS receiver so that whenever it dials a phone number in any of these Morse code dialing modes, it could send its GPS coordinates as a text message to the dialed number or to some other pre-set phone number. Furthermore, these GPS coordinates can be output in other radio-frequency domains, such as the GMRS/FRS frequency range, to aid in locating an emergency situation, for instance rescuing a lost snowboarder buried in an avalanche on a mountain.

In another embodiment of the present invention, instead of coding digits 0-9 in Morse code, the digits could be coded in binary (for example, "3" could be represented as 0 0 1 1). In this embodiment, for example, small peaks in tapping mode could represent 0 and larger peaks could represent 1. There could be several advantages in coding the signal in binary versus Morse. For example, instead of having to communicate 5 dits or dahs for each coded number, the user would only have to send 4 bits of information for each coded number. Another advantage of such a coding scheme is that it may require less memorization on the part of a user not familiar with Morse code.

In either scheme (Morse or binary) for coding the digits to be dialed, there are many combinations of dits and dahs or 1's and 0's that do not correspond to a digit between 0 and 9. For example, in binary, 1 1 1 1 would represent "15" and in Morse, dah-dit-dah-dit-dah is not a digit between 0 and 9. In another embodiment of the present invention, these supplementary combinations could be used to send other instructions to the wireless communications device. In binary coding, the digits from 10-15 could be used to automatically dial phone numbers programmed into the wireless communications device or tell the device to automatically dial the last number called. For example, when the user sends the device a "10" acoustically, the wireless communications device could automatically dial some number that the user has programmed into the device.

In another embodiment, more complex algorithms could be loaded into the digital signal processor to allow the user to communicate letters or punctuation in Morse or to increase the accuracy and efficiency of this method of dialing. For example, in the paper "Machine Recognition of Hand Sent Morse Code" by Bernard Gold published in March, 1959 in "IRE Transactions on Information Theory", Gold outlines an algorithm coded into a computer that allowed it to translate Morse code transmissions into text. The present invention could utilize such an algorithm to allow users to send text to the wireless communications device, for example, for text messages in any of the modes outlined in this application. Various other applications will be evident to one skilled in the art.

The foregoing disclosure of the exemplary embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A wireless communications device comprising:
   a transceiver within the device;
   a keypad within the device;
   a microphone within the device;
   a first logic unit for
      analyzing a plurality of coded incoming signals received through the microphone, the analysis including identification of a plurality of signal peaks and blocks, wherein the plurality of signal peaks and blocks correspond to a form of binary code,
      identifying a binary preamble within the coded incoming signals, the binary preamble indicating that a destination address will follow,
      generating an alert, the alert indicating that the binary preamble has been received, and
      identifying a valid destination address corresponding to a second device by analyzing a second plurality of signal peaks and blocks received subsequent to the binary preamble, each one of the signal peaks and blocks of the second plurality interpreted as one of a one and a zero in the form of binary code; and
   a second logic unit for automatically dialing the identified valid destination address.

2. The wireless communications device of claim 1, wherein the coded incoming signal comprises a plurality of sounds having varying durations or amplitudes and are generated via a user's voice or other action.

3. The wireless communications device of claim 2, wherein the first logic unit comprises a digital signal processor in communication with a microprocessor and a memory unit on the device.

4. The wireless communications device of claim 1, wherein the device is equipped with a GPS capability, and wherein a set of GPS coordinates for the device are sent to the destination address.

5. A wireless communications device comprising:
   a transceiver within the device;
   a keypad within the device;
   a microphone within the device;
   a first logic unit for
      analyzing a plurality of coded incoming signals received through the microphone, the analysis including identification of a plurality of signal peaks and blocks, wherein the plurality of signal peaks and blocks correspond to a form of Morse code,
      identifying a Morse code preamble within the plurality of coded incoming signals, the Morse code preamble indicating that a destination address will follow,
      generating an alert, the alert indicating that the Morse code preamble has been received, and
      identifying a valid destination address corresponding to a second device by analyzing a second plurality of signal peaks and blocks received subsequent to the Morse code preamble, each one of the signal peaks and blocks of the second plurality interpreted as one of a dit and dah in the form of Morse code; and
   a second logic unit for automatically dialing the identified valid destination address.

6. The wireless communications device of claim 5, wherein the first logic unit correlates the peaks and blocks to a Morse code table to identify the destination address of the second device.

7. The wireless communications device of claim 5, wherein the first logic unit comprises a digital signal processor in communication with a microprocessor and a memory unit on the device.

8. The wireless communications device of claim 5, wherein the device is equipped with a GPS capability such that a set of GPS coordinates of the device is sent to the destination address.

9. A wireless communications device comprising:
   a transceiver;
   a keypad;
   a microphone for receiving acoustic signals representing digits of a phone number, wherein the digits are communicated through a plurality of acoustic signals corresponding to binary notation for each digit in the phone number;
   a means for analyzing the acoustic signal, the analysis including identification of a plurality of signal peaks and blocks, wherein the plurality of signal peaks and blocks correspond to a form of binary notation, identifying a binary preamble within the plurality of acoustic signals, the binary preamble indicating that a phone number will follow, generating an alert, the alert indicating that the binary preamble has been received, and identifying a valid phone number by analyzing a second plurality of signal peaks and blocks received subsequent to the binary preamble, each one of the signal peaks and blocks of the second plurality interpreted as one of a one and a zero in the form of binary notation; and a means for automatically dialing the identified valid phone number after it has been received by the phone.

10. The wireless communications device of claim 9, wherein means for analyzing the acoustic signal for the phone number to be dialed is implemented using a digital signal processor in communication with a microprocessor and a memory unit on the device.

11. A method for dialing a wireless communications device having a microphone, the method comprising:

receiving on the microphone of the wireless communications device an acoustic signal;

analyzing the acoustic signal, the analysis including identification of a plurality of signal peaks and blocks, wherein the plurality of signal peaks and blocks correspond to a form of binary code, identifying a binary preamble within the acoustic signal, the binary preamble indicating that a destination address will follow;

generating an alert, the alert indicating that the preamble has been received;

identifying a valid destination address by analyzing a second plurality of signal peaks and blocks received subsequent to the binary preamble, each one of the signal peaks and blocks of the second plurality interpreted as one of a one and a zero in the form of binary notation; and dialing the identified valid destination address.

12. The method of claim 11, wherein the acoustic signal comprises a plurality of tapping sounds.

13. The method of claim 11, wherein the acoustic signal comprises a user's voice.

14. A method for dialing a destination address on wireless communication device having a microphone, the method comprising:

analyzing an incoming acoustic signal through the microphone of the wireless communication device, the analysis including identification of a plurality of signal peaks and blocks, wherein the signal peaks and blocks correspond to a form of Morse code;

identifying a Morse code preamble within the incoming acoustic signal, the Morse code preamble indicating that the destination address will follow;

generating an alert, the alert indicating that the Morse code preamble has been received;

identifying a valid destination address by analyzing a second plurality of signal peaks and blocks received subsequent to the Morse code preamble, each one of the signal peaks and blocks of the second plurality interpreted as one of a dit and a dah in the form of Morse code; and dialing the identified valid destination address.

\* \* \* \* \*